(12) United States Patent
Suzuki et al.

(10) Patent No.: US 10,919,494 B2
(45) Date of Patent: Feb. 16, 2021

(54) DISTRIBUTION DEVICE, KEY INFORMATION SHARING SYSTEM, METHOD OF CONTROLLING DISTRIBUTION DEVICE, AND RECORDING MEDIUM

(71) Applicant: TOYOTA JIDOSHA KABUSHIKI KAISHA, Toyota (JP)

(72) Inventors: Ryuichi Suzuki, Nagakute (JP); Yuki Ito, Iwakura (JP); Hiroyasu Shiokawa, Nagoya (JP); Yasumasa Kobayashi, Nagoya (JP); Naoki Yamamuro, Nagoya (JP); Makoto Akahane, Nagoya (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 0 days.

(21) Appl. No.: 16/177,804

(22) Filed: Nov. 1, 2018

(65) Prior Publication Data
US 2019/0176753 A1  Jun. 13, 2019

(30) Foreign Application Priority Data
Dec. 11, 2017  (JP) .............................. JP2017-237004

(51) Int. Cl.
*H04W 12/08* (2009.01)
*H04W 4/08* (2009.01)
(Continued)

(52) U.S. Cl.
CPC .......... *B60R 25/24* (2013.01); *G07C 9/00309* (2013.01); *G07C 9/00571* (2013.01);
(Continued)

(58) Field of Classification Search
CPC .............. B60R 2325/205; B60R 25/24; B60R 25/2018; B60R 25/209; B60R 25/241;
(Continued)

(56) References Cited

U.S. PATENT DOCUMENTS 9,232,345 B1 * 1/2016 Rencher ................. H04W 4/80
10,387,826 B2 * 8/2019 Simmons ................ G07C 9/27
(Continued)

FOREIGN PATENT DOCUMENTS

JP  2012-041709  3/2012
JP  2015-169008  9/2015

*Primary Examiner* — Dionne Pendleton
(74) *Attorney, Agent, or Firm* — Oblon, McClelland, Maier & Neustadt, L.L.P.

(57) ABSTRACT

A distribution device includes a server device configured to distribute key information to a portable terminal. The key information is used for a key system that determines whether or not to lock and unlock a vehicle, to make the vehicle travel, and to use a content providing device that provides digital contents in a vehicle cabin of the vehicle by transmitting the key information from the portable terminal to the vehicle. The server device is configured to distribute the key information to which restricted function information is added, to the portable terminal. The restricted function information is information indicating that locking and unlocking of the vehicle and use of the content providing device are permitted but traveling of the vehicle is not permitted.

3 Claims, 7 Drawing Sheets

(51) Int. Cl.
*H04L 29/08* (2006.01)
*G07C 9/00* (2020.01)
*B60R 25/24* (2013.01)
*H04W 12/04* (2021.01)

(52) U.S. Cl.
CPC ..... *H04W 12/04* (2013.01); *H04W 12/04031* (2019.01); *H04W 12/08* (2013.01); *B60R 2325/205* (2013.01); *G07C 2009/00261* (2013.01); *G07C 2009/00531* (2013.01); *G07C 2009/00769* (2013.01)

(58) Field of Classification Search
CPC ............ B60R 25/257; B60R 2325/101; B60R 2325/105; B60R 2325/202; B60R 25/021; B60R 25/02153; B60R 25/04; B60R 25/10; B60R 25/25; B60R 25/252; B60R 25/406; B60R 25/2081; G06Q 10/0832; G06Q 10/087; G07C 2009/00452; G07C 2009/00468; G07C 2009/00547; G07C 2009/00769; G07C 9/00309; G07C 9/00571; G07C 2009/00793; G07C 2009/00865; G07C 9/00857; G07C 2209/63; G07C 9/29; G07C 2009/00349; G07C 2009/00373; G07C 2009/00476; G07C 2009/00841; G07C 2009/0088; G07C 2209/08; G07C 2209/62; G07C 5/008; G07C 9/00182; G07C 9/00563; G07C 9/21; G07C 9/27; H04L 67/12; H04L 9/088; H04L 9/0891; H04L 63/062; H04L 63/108; H04L 2209/56; H04L 2209/608; H04L 2209/805; H04L 2209/88; H04L 63/0442; H04L 63/061; H04L 63/107; H04L 63/18; H04L 67/10; H04L 67/125; H04L 9/0825; H04L 9/0841; H04L 9/302; H04L 9/321; H04L 9/3249; H04W 12/06; H04W 12/08; H04W 4/40; H04W 4/50; H04W 4/80; H04W 12/003; H04W 12/04; H04W 12/00403; H04W 12/00502; H04W 12/02; H04W 4/44; H04W 4/70; H04M 2250/04
See application file for complete search history.

(56) References Cited

U.S. PATENT DOCUMENTS 10,439,868 B2 * 10/2019 Lim ................... H04N 5/4403
2011/0264304 A1 * 10/2011 Burzio ................. B60R 25/04
  701/2
2015/0193726 A1    7/2015 Simmons

* cited by examiner

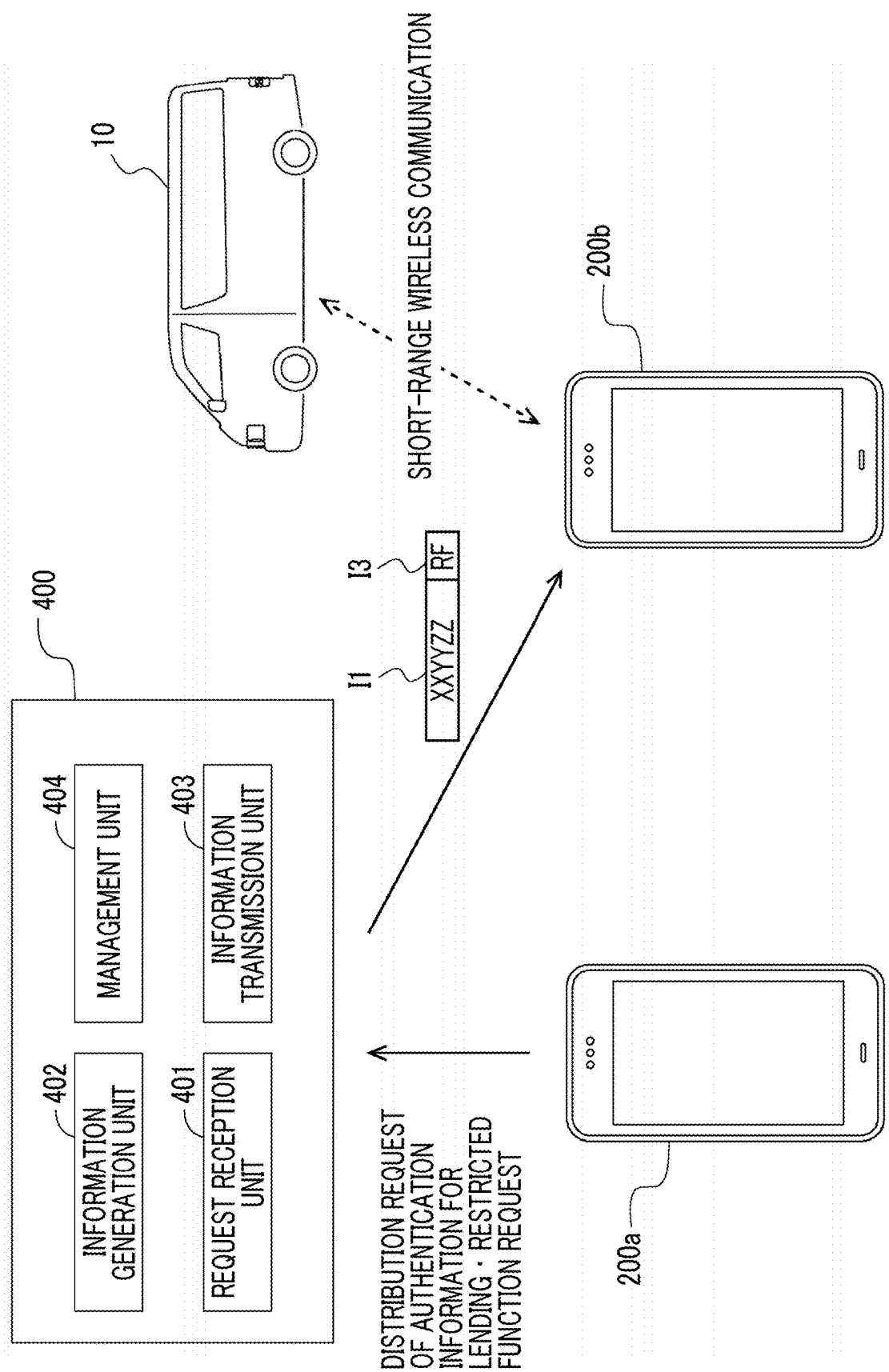

DISTRIBUTION DEVICE, KEY INFORMATION SHARING SYSTEM, METHOD OF CONTROLLING DISTRIBUTION DEVICE, AND RECORDING MEDIUM

INCORPORATION BY REFERENCE

The disclosure of Japanese Patent Application No. 2017-237004 filed on Dec. 11, 2017 including the specification, drawings and abstract is incorporated herein by reference in its entirety.

BACKGROUND

1. Technical Field

The present disclosure relates to a distribution device that distributes key information of a vehicle, a key information sharing system that shares the key information, a method of controlling a distribution device, and a non-transitory computer-readable recording medium storing a program causing a computer to execute the method of controlling a distribution device.

2. Description of Related Art

A system that enables use of a vehicle by transmitting key information from a portable terminal carried by a user of the vehicle to the vehicle (hereinafter may be referred to as "key system") has been developed. Here, the key information is information associated with the vehicle, and is information for making the vehicle available for use.

For example, Japanese Unexamined Patent Application Publication No. 2015-169008 (JP 2015-169008 A) discloses a system that enables operation of a vehicle in a case where key authentication is established between an electronic key (smart key) and the vehicle when identification information transmitted from the electronic key to the vehicle matches identification information of the vehicle and terminal authentication is established between the vehicle and the portable terminal on which pairing is being performed. In this case, the identification information transmitted from the electronic key to the vehicle corresponds to the key information.

Japanese Unexamined Patent Application Publication No. 2012-041709 (JP 2012-041709 A) discloses a technique for delivering key information on a specific vehicle to another user (third party), the key information being information on an electronic key carried by a user. In the technique disclosed in JP 2012-041709 A, first, a user terminal carried by the user receives key information from the electronic key of the user through short-range wireless communication. Next, the user terminal transmits the key information to a third party terminal carried by the third party. Then, an electronic key of the third party receives the key information received by the third party terminal through the short-range wireless communication. Accordingly, the electronic key of the third party can be used as a key for the specific vehicle.

SUMMARY

A content providing device capable of providing various digital contents (movie, music, book, game, website, and the like) in a vehicle cabin can be mounted on the vehicle. In a case where such a content providing device is mounted on the vehicle, it is possible to use the vehicle as a space for using contents that can be provided by the content providing device even when the vehicle does not travel. Therefore, in a time slot in a case where an owner of a vehicle on which such a content providing device is mounted does not use the host vehicle, utilizing the host vehicle more effectively can be considered by lending the host vehicle to other person as the content use space.

Here, in a case where a vehicle adopts the key system as described above, by providing key information of the vehicle to another person who wants to use the vehicle as the content use space, the other person can use the vehicle. A problem, however, occurs in this case, that is, the other person that can use the vehicle not only can use the vehicle as a content use space but also can make the vehicle travel.

The present disclosure provides a distribution device, a key information sharing system, a method of controlling a distribution device, and a non-transitory readable recording medium storing a program causing a computer to execute the method of controlling a distribution device that enables the vehicle on which the content providing device is mounted to be more suitably utilized as the content use space.

A first aspect of the present disclosure relates to a distribution device. The distribution device includes a server device configured to distribute key information to a portable terminal. The key information is used for a key system that determines whether or not to lock and unlock a vehicle, to make the vehicle travel, and to use a content providing device that provides digital contents in a vehicle cabin of the vehicle by transmitting the key information from the portable terminal to the vehicle. The server device is configured to distribute the key information to which restricted function information is added, to the portable terminal. The restricted function information is information indicating that locking and unlocking of the vehicle and use of the content providing device are permitted but traveling of the vehicle is not permitted.

The distribution device according to the first aspect of the present disclosure distributes the key information of the vehicle on which the content providing device is mounted to the portable terminal carried by a user of the vehicle. That is, the user can use the vehicle by receiving the key information from the distribution device by the portable terminal. On the other hand, in the distribution device according to the first aspect of the present disclosure, the restricted function information is added to the key information distributed to the portable terminal by the server device. Here, the restricted function information is information indicating that locking and unlocking of the vehicle and use of the content providing device are permitted but traveling of the vehicle is not permitted according to the key information. In other words, in a case where the restricted function information is added to the key information received by the portable terminal from the distribution device, locking and unlocking of the vehicle and use of the content providing device are permitted but traveling of the vehicle is not permitted by transmitting the key information from the portable terminal to the vehicle. Here, a state in which the vehicle can travel is a state in which the vehicle can travel by controlling a drive source (internal combustion engine or motor) of the vehicle.

Therefore, by adding the restricted function information to the key information distributed to the portable terminal carried by the user of the vehicle, use of the vehicle as the content use space by the user is possible but traveling of the vehicle by the user is not possible. Therefore, it possible to more suitably utilize the vehicle on which the content providing device is mounted as the content use space by distributing the key information to which such restricted function information is added from the distribution device.

In the distribution device according to the first aspect of the present disclosure, the server device may be configured to distribute the key information to which deliverable and receivable information making the key information deliverable and receivable between a first user terminal that is a portable terminal carried by a first user of the vehicle and a second user terminal that is a portable terminal carried by a second user of the vehicle without going through the server device is added together with the restricted function information, to the first user terminal.

In this case, for example, the first user may be an owner of the vehicle and the second user may be the other person who borrows the vehicle owned by the first user as the content use space. In the above case, in the distribution device, the deliverable and receivable information together with the restricted function information is added to the key information distributed to the first user terminal by the server device. Here, the deliverable and receivable information enables the key information to be transmitted from the first user terminal to the second user terminal without going through the server device. In other words, in a case where the deliverable and receivable information is not added to the received key information, the first user terminal cannot transmit the key information to the second user terminal.

The first user can deliver the key information in a state in which the restricted function information is added, to the second user terminal of the second user, by receiving the key information to which the deliverable and receivable information together with the restricted function information is added using the first user terminal. Then, the second user receives the key information in a state in which the restricted function information is added, which is transmitted from the first user terminal, using the second user terminal, and can use the vehicle solely as the content use space.

According to the first aspect of the present disclosure, since the key information in a state in which the restricted function information is added can be transmitted from the first user terminal to the second user terminal without going through the server device, it is possible to more smoothly deliver the key information in a case of lending the vehicle as the content use space. On the other hand, since the key information delivered to the second user terminal is also distributed from the distribution device, the key information delivered from the first user terminal to the second user terminal can be recorded or managed on a distribution device side. Therefore, it is possible to deliver the key information to the second user terminal while security is ensured.

A second aspect of the present disclosure relates to a key information sharing system. The key information sharing system includes a first user terminal that is a portable terminal carried by a first user of a vehicle, a second user terminal that is a portable terminal carried by a second user of the vehicle, and a server device configured to distribute key information to the first user terminal. The key information is used for a key system that determines whether or not to lock and unlock the vehicle, to make the vehicle travel, and to use a content providing device that provides digital contents in a vehicle cabin of the vehicle by transmitting the key information from the first user terminal or the second user terminal to the vehicle. The server device is configured to distribute the key information to which restricted function information is added, to the first user terminal. The restricted function information is information indicating that locking and unlocking of the vehicle and use of the content providing device are permitted but traveling of the vehicle is not permitted. The server device is configured to distribute the key information to which deliverable and receivable information making the key information deliverable and receivable between the first user terminal and the second user terminal without going through the server device is added together with the restricted function information, to the first user terminal. The first user terminal is configured to transmit the key information in a state in which the restricted function information is added, to the second user terminal according to an input manipulation of the first user in a case where the deliverable and receivable information together with the restricted function information is added to the key information received from the server device.

With the key information sharing system according to the second aspect of the present disclosure, the first user receives the key information to which the deliverable and receivable information together with the restricted function information is added from the server device using the first user terminal. Then, according to the input manipulation to the first user terminal by the first user, the key information in a state in which the restricted function information is added is delivered to the second user terminal. Accordingly, the second user can use the vehicle solely as the content use space.

In the key information sharing system according to the second aspect of the present disclosure, the first user terminal may include an inter-terminal communicator configured to transmit the key information in a state in which the restricted function information is added, to the second user terminal according to the input manipulation of the first user in a case where the deliverable and receivable information together with the restricted function information is added to the key information received from the server device.

A third aspect of the present disclosure relates to a method of controlling a distribution device. The distribution device includes a server device configured to distribute key information to a portable terminal, and the key information is used for a key system that determines whether or not to lock and unlock a vehicle, to make the vehicle travel, and to use a content providing device that provides digital contents in a vehicle cabin of the vehicle by transmitting the key information from the portable terminal to the vehicle. The method includes generating the key information to which restricted function information is added using the server device, the restricted function information being information indicating that locking and unlocking of the vehicle and use of the content providing device are permitted but traveling of the vehicle is not permitted, and distributing the key information to which the restricted function information is added, to the portable terminal using the server device.

A fourth aspect of the present disclosure relates to a non-transitory readable recording medium storing a program causing a computer to execute a method of controlling a distribution device. The distribution device includes a server device configured to distribute key information to a portable terminal. The key information is used for a key system that determines whether or not to lock and unlock a vehicle, to make the vehicle travel, and to use a content providing device that provides digital contents in a vehicle cabin of the vehicle by transmitting the key information from the portable terminal to the vehicle. The program causes a control process of the distribution device to be executed. The control process includes generating the key information to which restricted function information is added using the server device, the restricted function information being information indicating that locking and unlocking of the vehicle and use of the content providing device are permitted but traveling of the vehicle is not permitted, and distributing the key information to which the restricted function information is added, to the portable terminal using the server device.

According to the aspects of the present disclosure, it is possible to more suitably utilize a vehicle on which a content providing device is mounted as the content use space.

BRIEF DESCRIPTION OF THE DRAWINGS

Features, advantages, and technical and industrial significance of exemplary embodiments of the present disclosure will be described below with reference to the accompanying drawings, in which like numerals denote like elements, and wherein:

FIG. 7 is a diagram for describing a method of delivering and receiving authentication information in an authentication information sharing system according to a third modification example of the embodiment.

DETAILED DESCRIPTION OF EMBODIMENTS

Hereinafter, specific embodiments of the present disclosure will be described with reference to the drawings. Dimensions, materials, shapes, relative dispositions, and the like of components described in the embodiment are not intended to limit the technical scope of the present disclosure solely to those unless otherwise specified.

Embodiment

Outline of Key System

Figure 1:
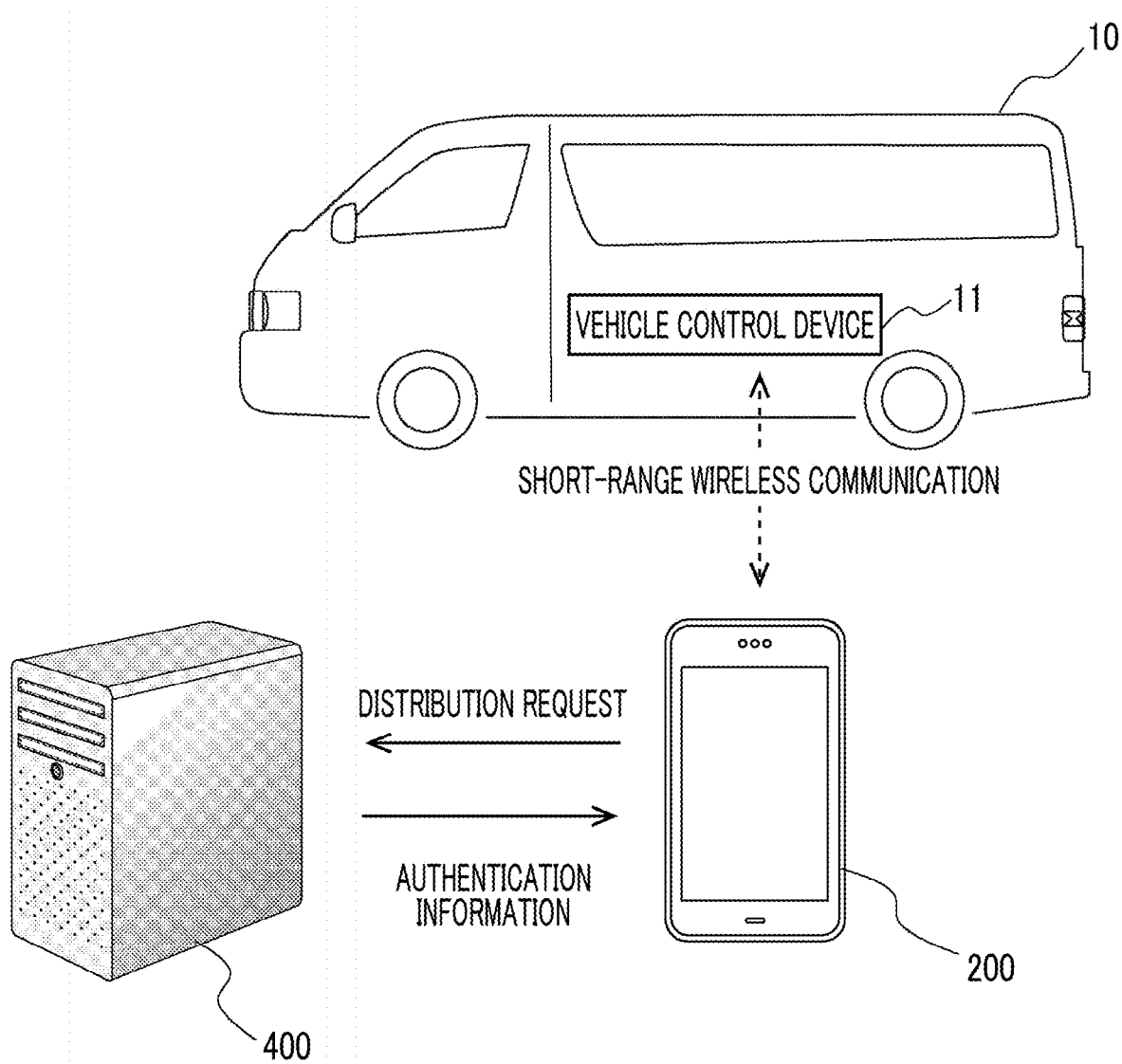
FIG. 1 is a diagram illustrating an outline of a key system according to an embodiment.

FIG. 1 is a diagram illustrating an outline of a key system according to an embodiment. The key system according to the embodiment is configured to include a vehicle control device 11 mounted on a vehicle 10, a portable terminal 200, and a server device 400. The portable terminal 200 is a terminal carried by a person (user) who uses the vehicle 10. The server device 400 is a distribution device that distributes authentication information associated with the vehicle 10.

In the key system according to the embodiment, the portable terminal 200 and the server device 400 are connected to each other via a network such as the Internet which is a public communication network. Then, the portable terminal 200 transmits a distribution request of the authentication information associated with the vehicle 10 to the server device 400. When the server device 400 receives the distribution request from the portable terminal 200, the server device 400 distributes the authentication information to the portable terminal 200. The portable terminal 200 transmits the authentication information received from the server device 400 to the vehicle control device 11 mounted on the vehicle 10 through short-range wireless communication. The vehicle control device 11 authenticates the authentication information received from the portable terminal 200. In a case where the authentication information is successfully authenticated, the vehicle control device 11 can control the vehicle 10. In the embodiment, the authentication information is an example of "key information" and the server device 400 is an example of "distribution device".

System Configuration of Key System

Figure 2:
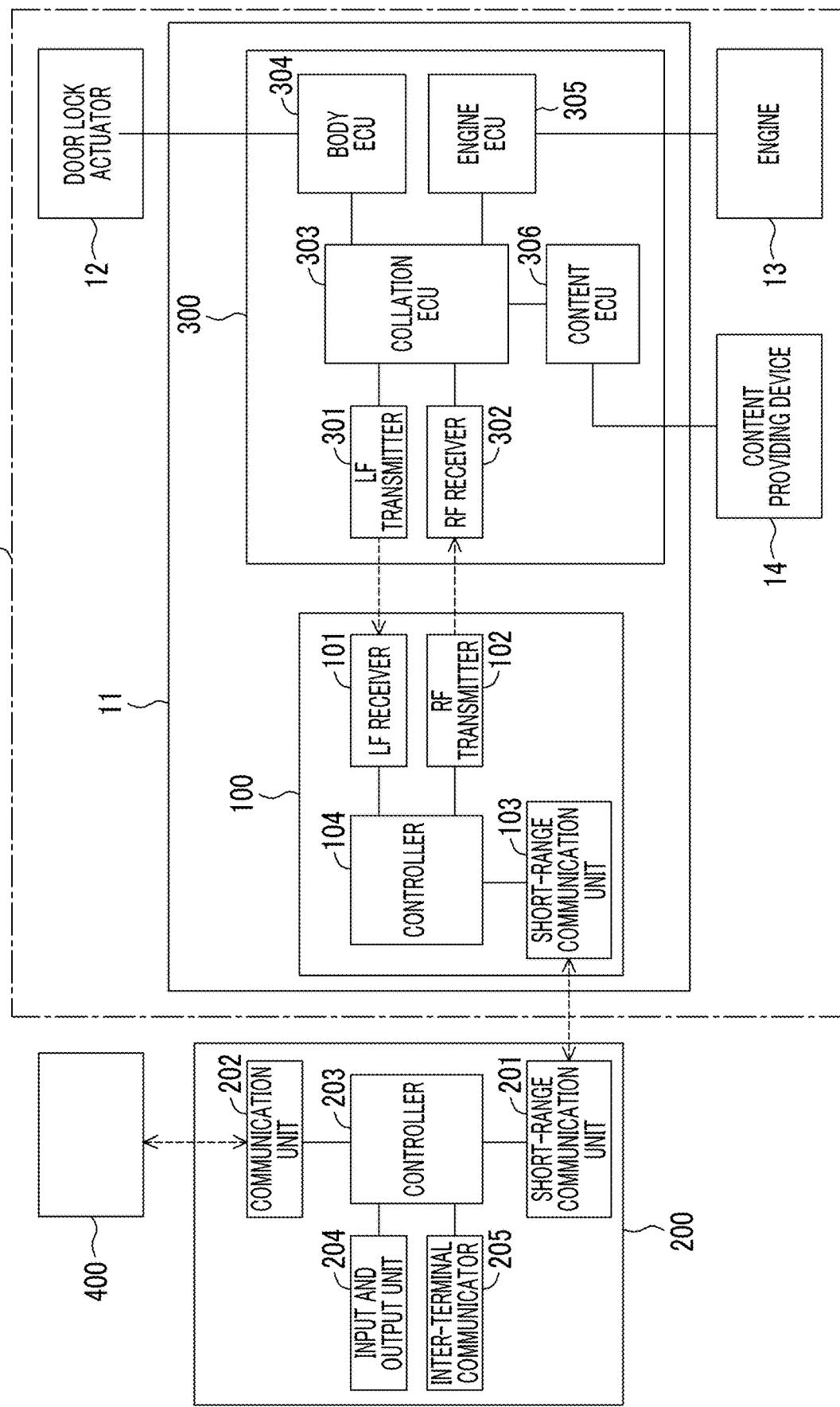
FIG. 2 is a block diagram schematically illustrating an example of a configuration of a portable terminal, a server device, and a vehicle control device mounted on a vehicle illustrated in FIG. 1.

Each component in the key system according to the embodiment will be described with reference to FIG. 2. FIG. 2 is a block diagram schematically illustrating an example of the configuration of the portable terminal 200, the server device 400, and the vehicle control device 11 mounted on the vehicle 10 illustrated in FIG. 1. The vehicle control device 11 includes a key unit 100 that communicates with the portable terminal 200 and a control device 300 that executes various controls on the vehicle 10.

Specifically, the control device 300 executes a locking and unlocking control for locking and unlocking a door of the vehicle 10 by controlling a door lock actuator 12 of the vehicle 10. The control device 300 executes an engine control such as a start control for starting an engine 13 which is a drive source of the vehicle 10. The control device 300 controls a content providing device 14 mounted on the vehicle 10. Here, the content providing device 14 is a device that provides various digital contents (movie, music, book, game, website, and the like) in a vehicle cabin of the vehicle 10. The content providing device 14 can acquire the content to be provided to the user in the vehicle cabin from the outside via a network such as the Internet. The content providing device 14 may store storage means for storing the content in advance. Then, the content providing device 14 provides desired content to the user according to the manipulation by the user in the vehicle cabin. The control device 300 transmits and receives radio waves in a radio frequency (hereinafter referred to as RF) band and a low frequency (hereinafter referred to as LF) band to and from the key unit 100 in the vehicle 10, so that the control device 300 executes the above-described control.

The control device 300 is configured to include an LF transmitter 301, an RF receiver 302, a collation electronic control unit (ECU) 303, a body ECU 304, an engine ECU 305, and a content ECU 306. The LF transmitter 301 is a device that transmits radio waves in an LF band (for example, 100 KHz to 300 KHz) for checking (polling) the key unit 100. The RF receiver 302 is a device that receives radio waves in an RF band (for example, 100 MHz to 1 GHz) transmitted from the key unit 100.

The collation ECU 303 is a computer that controls the body ECU 304, the engine ECU 305, and the content ECU 306 based on a command signal transmitted from the key unit 100 via radio waves in the RF band. The collation ECU 303 is constituted by, for example, a microcomputer. The collation ECU 303 authenticates that the command signal transmitted from the key unit 100 is transmitted from an authorized device. Specifically, the collation ECU 303 determines whether or not a key ID included in the command signal matches a key ID stored in advance in a storage unit of the collation ECU 303.

In a case where the collation ECU 303 successfully authenticates the key ID, the collation ECU 303 transmits a command according to the command signal to the body ECU 304, the engine ECU 305, and the content ECU 306 via an in-vehicle network such as a controller area network (CAN). Specifically, in a case where the command signal received from the key unit 100 is a locking signal, the collation ECU 303 transmits a locking command for locking the door of the vehicle 10 to the body ECU 304. In a case where the command signal received from the key unit 100 is an unlocking signal, the collation ECU 303 transmits an unlocking command for unlocking the door of the vehicle 10 to the body ECU 304. In a case where the command signal received from the key unit 100 is an engine start permission signal, the collation ECU 303 transmits an engine start permission command for making a state of the engine 13 of the vehicle 10 enter into an engine startable state, to the engine ECU 305. In a case where the command signal received from the key unit 100 is a content use permission signal, the collation ECU 303 transmits a content use permission command for making the content providing device 14 mounted on the vehicle 10 available to the content ECU 306.

The body ECU 304 is a computer that controls a body of the vehicle 10. The body ECU 304 is electrically connected to the door lock actuator 12 that locks and unlocks the door of the vehicle 10. The body ECU 304 has a function of unlocking and locking the door of the vehicle 10 by controlling the door lock actuator 12 based on the unlocking command or the locking command received from the collation ECU 303.

The engine ECU 305 is a computer that controls the engine 13 of the vehicle 10. The engine ECU 305 is electrically connected to various devices that control the engine 13, such as a fuel injection valve, a spark plug, a throttle valve, and a starter (all not shown). In a case where the engine ECU 305 receives the engine start permission command from the collation ECU 303, the engine ECU 305 enters into the engine startable state capable of starting the engine 13 that has been stopped. The engine startable state is a state in which the start control of the engine 13 by the engine ECU 305 can be performed in a case where an ignition switch (or push start switch) is turned on in the vehicle 10.

The content ECU 306 is a computer that controls the content providing device 14. The content ECU 306 is electrically connected to the content providing device 14. In a case where the content ECU 306 receives a content use permission command from the collation ECU 303, the content ECU 306 enters into a content usable state capable of controlling the content providing device 14. In a case where the content ECU 306 enters into the content usable state, the user can manipulate the content providing device 14 in the vehicle cabin.

The key unit 100 will be described. The key unit 100 is a device disposed at a predetermined position (for example, in a glove compartment) in the vehicle cabin of the vehicle 10. The key unit 100 has a function of authenticating the portable terminal 200 by performing short-range wireless communication with the portable terminal 200 and a function of transmitting a command signal to the control device 300 by using radio waves in the RF band based on the authentication result. The key unit 100 is configured to include an LF receiver 101, an RF transmitter 102, a short-range communication unit 103, and a controller 104.

The LF receiver 101 is a device that receives a polling signal transmitted from the control device 300 via radio waves in the LF band. The RF transmitter 102 is a device that transmits a command signal to the control device 300 via radio waves in the RF band. The short-range communication unit 103 is a device that communicates with the portable terminal 200 outside the vehicle 10. The short-range communication unit 103 performs communication at a short range (to the extent that communication between the inside of the vehicle cabin and the outside of the vehicle cabin can be performed) using a predetermined wireless communication standard. Examples of communication standards that can be used for communication by the short-range communication unit 103 can include Bluetooth (registered trademark) Low Energy standard, near field communication (NFC), ultra wide band (UWB), and Wi-Fi (registered trademark).

The controller 104 is a computer that performs processing of short-range wireless communication with the portable terminal 200, processing of authenticating the portable terminal 200, processing of transmitting a command signal to the control device 300, and the like. The controller 104 is constituted by, for example, a microcomputer.

The controller 104 has a function of controlling the LF receiver 101, the RF transmitter 102, and the short-range communication unit 103. The controller 104 authenticates the authentication information included in a control request transmitted from the portable terminal 200 through short-range wireless communication. Specifically, the controller 104 determines whether the authentication information transmitted from the portable terminal 200 matches the authentication information stored in advance in the storage unit of the controller 104. In a case where the authentication is successful, the controller 104 transmits a command signal according to the control request received from the portable terminal 200 to the control device 300 via the RF transmitter 102. Specifically, in a case where the control request received from the portable terminal 200 is a locking request, the controller 104 transmits the locking signal to the control device 300. In a case where the control request received from the portable terminal 200 is an unlocking request, the controller 104 transmits the unlocking signal, the engine start permission signal, and the content use permission signal to the control device 300.

At this time, the key unit 100 transmits a key ID together with the command signal to the control device 300. The key ID may be stored in advance in the key unit 100 in a plain text state or may be stored in a state encrypted with a cryptogram unique to the portable terminal 200. In a case where the key ID is stored in the encrypted state, the encrypted key ID may be decrypted by the authentication information transmitted from the portable terminal 200 to obtain the original key ID.

The portable terminal 200 will be described. The portable terminal 200 is a compact computer such as a smartphone, a mobile phone, a tablet terminal, a personal information terminal, or a wearable computer (such as a smart watch). The portable terminal 200 is configured to include a short-range communication unit 201, a communication unit 202, an inter-terminal communicator 205, a controller 203, and an input and output unit 204.

The short-range communication unit 201 is a device that communicates with the key unit 100 of the vehicle control device 11 according to the same communication standard as that of the short-range communication unit 103. The communication unit 202 is a device that connects the portable terminal 200 to a network in order to communicate with the server device 400. The communication unit 202 can communicate with the server device 400 via the network using, for example, a mobile communication service such as 3G or LTE. The inter-terminal communicator 205 is means for communicating with another portable terminal. The inter-terminal communicator 205 may be a device that performs short-range wireless communication with another portable terminal with the same communication standard as that of the short-range communication unit 201. Similar to the communication unit 202, the inter-terminal communicator 205 may be a device that communicates with another portable terminal via the network.

The controller 203 is a computer that controls the portable terminal 200. The controller 203 is constituted by, for example, a microcomputer. The controller 203 controls the short-range communication unit 201, the communication unit 202, and the inter-terminal communicator 205 according to an input manipulation performed on the input and output unit 204 by the user. For example, the controller 203 performs processing of requesting distribution of the authentication information corresponding to the vehicle 10 to the server device 400 via the communication unit 202 and receiving the distributed authentication information. The authentication information received from the server device 400 is stored in the storage unit of the controller 203. The controller 203 generates a control request according to the input manipulation by the user and performs processing of transmitting the control request together with the authentication information stored in the storage unit to the key unit 100 via the short-range communication unit 201. The controller 203 transmits the authentication information received from the server device 400 to another portable terminal via the inter-terminal communicator 205. The details of delivering and receiving of the authentication information between the portable terminals via the inter-terminal communicator 205 will be described later.

The input and output unit 204 also functions as means for receiving the input manipulation performed by the user and presenting information to the user. Specifically, the input and output unit 204 configured to include a touch panel display and control means of the touch panel display. The input and output unit 204 may include a hardware switch or the like manipulated by the user.

Operation of Key System

Figure 3:
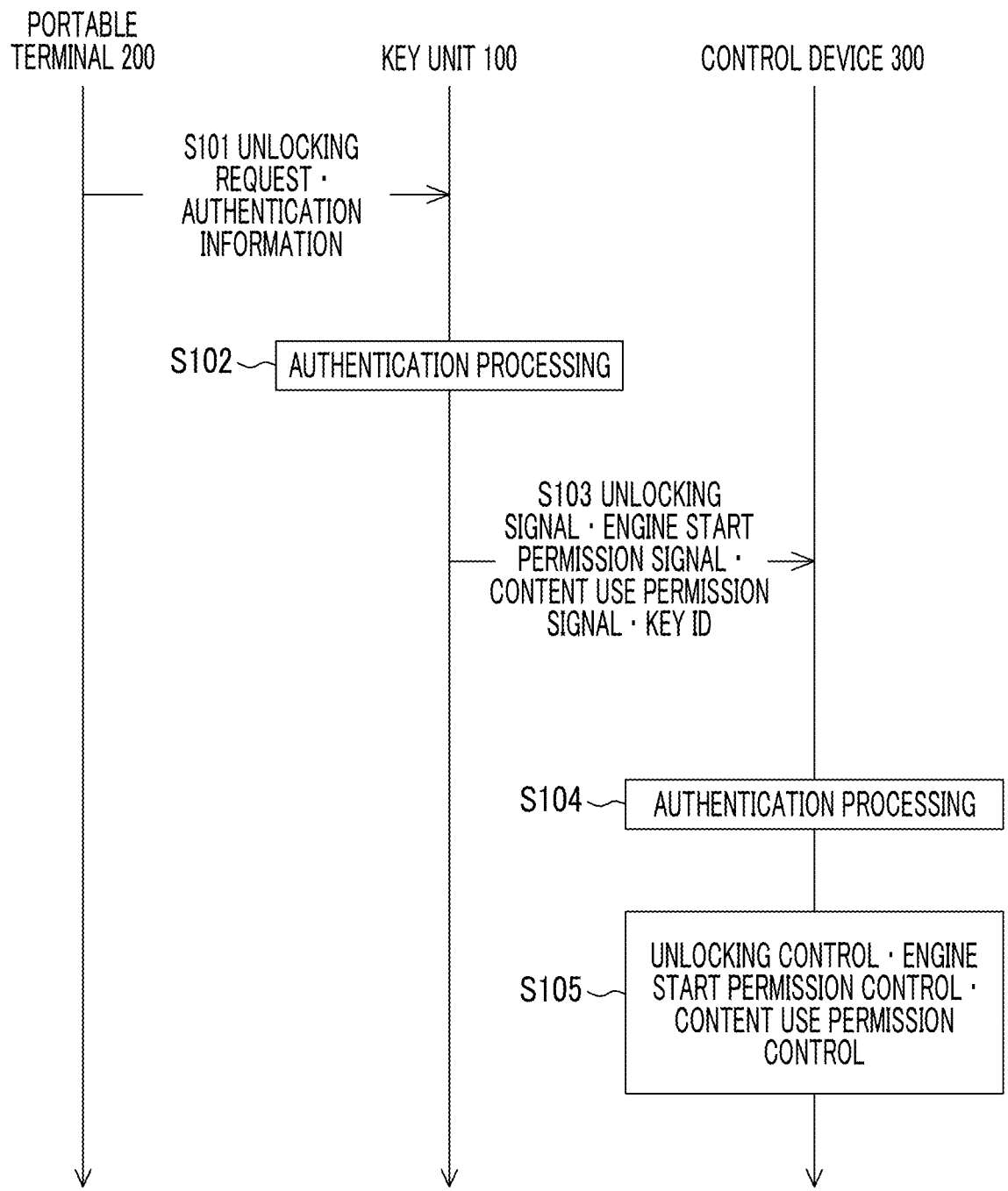
FIG. 3 is a diagram illustrating processing and data flow in a case where a door of the vehicle is unlocked.

Here, the operation of the key system in a case where the user controls the vehicle 10 using the portable terminal 200 will be described by taking a case of unlocking the door of the vehicle 10 as an example. FIG. 3 is a diagram illustrating processing and data flow in a case where the door of the vehicle 10 is unlocked.

In a case where the user performs a manipulation of unlocking the door of the vehicle 10 to the portable terminal 200, the portable terminal 200 transmits authentication information together with the unlocking request to the key unit 100 of the vehicle control device 11 (S101). Then, the key unit 100 performs authentication processing based on the authentication information received from the portable terminal 200 (S102). In a case where the authentication information is successfully authenticated, the key unit 100 transmits the key ID together with the unlocking signal, the engine start permission signal, and the content use permission signal to the control device 300 (S103). Then, the control device 300 performs authentication processing based on the key ID received from the key unit 100 (S104). In a case where the key ID is successfully authenticated, the control device 300 performs an unlocking control for unlocking the door of the vehicle 10, an engine start permission control for making the engine ECU 305 enter into the engine startable state, and a content use permission control for making the content ECU 306 enter into the content usable state (S105).

Sharing of Authentication Information

With the key system described above, in a case where the authentication information is received by the portable terminal carried by the user of the vehicle 10, the portable terminal can be used as the key of the vehicle 10. Here, in a case where an owner of the vehicle 10 (hereinafter also referred to as "first user") lends the vehicle 10 to another person (hereinafter also referred to as "second user) as the content use space by using such a key system, the first user needs to provide the authentication information to the second user. Hereinafter, according to the embodiment, an authentication information sharing system that provides the authentication information from the first user to the second user will be described.

Figure 4:
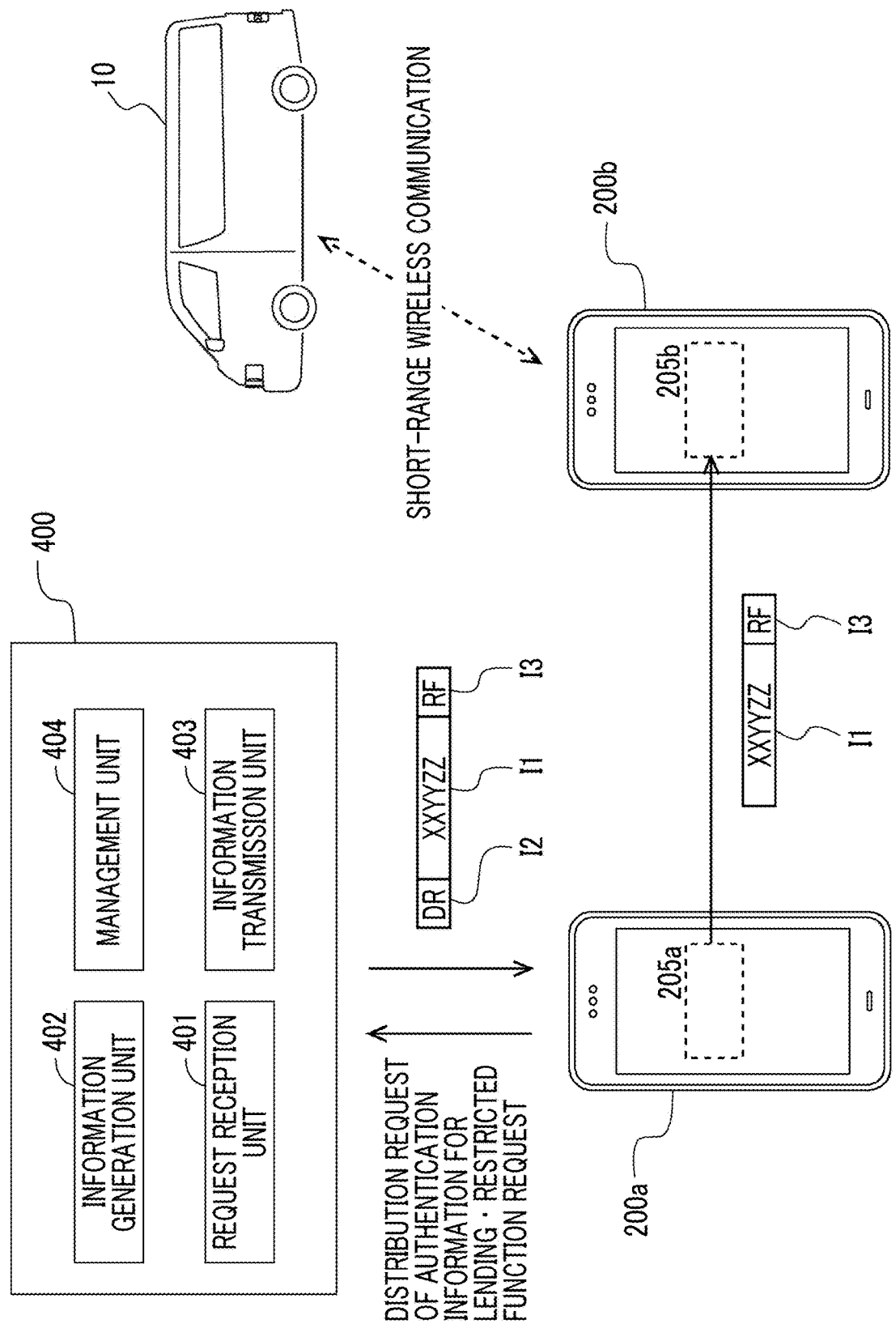
FIG. 4 is a diagram for describing a method of delivering and receiving authentication information in an authentication information sharing system according to the embodiment.
Figure 5:
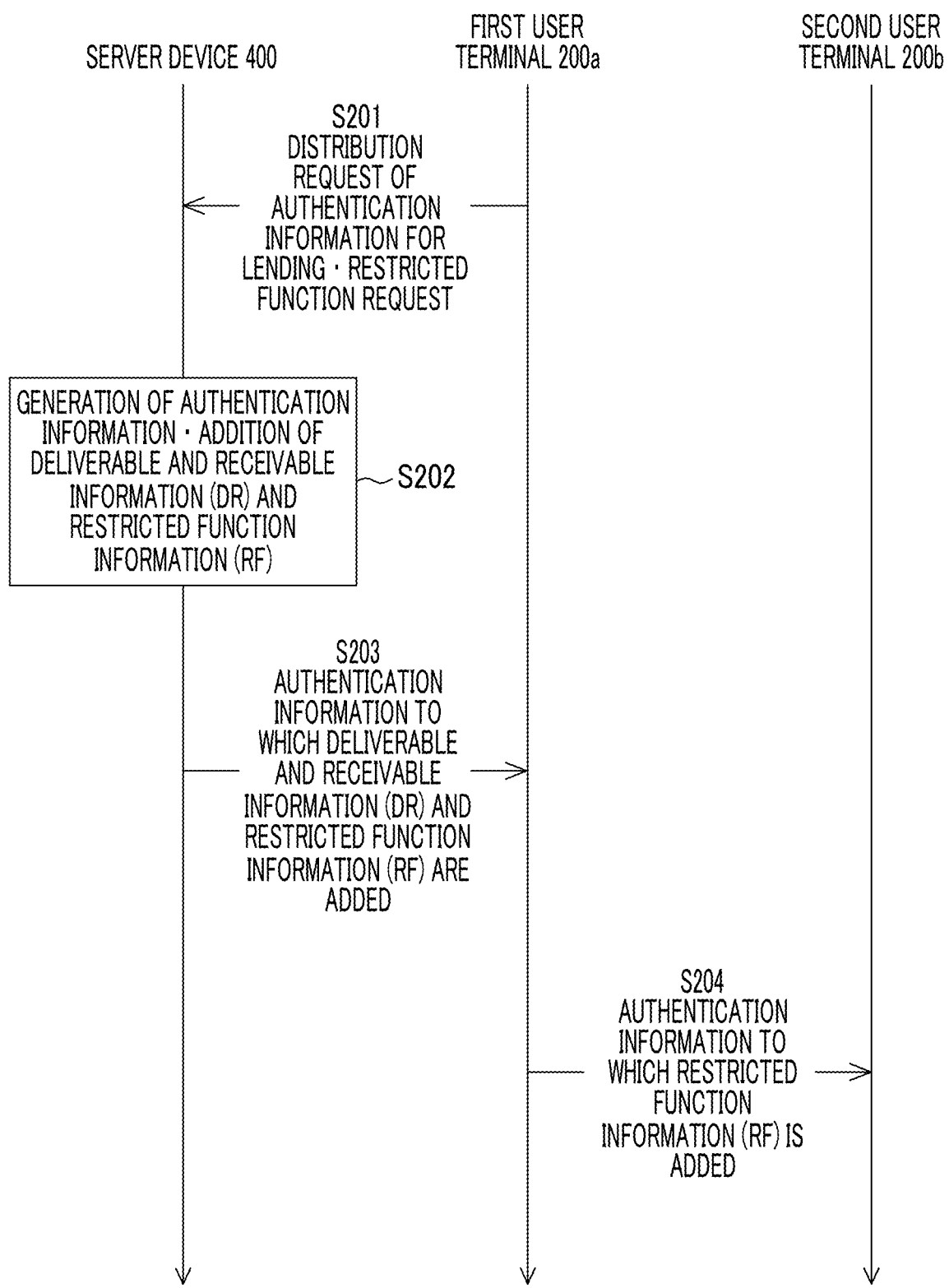
FIG. 5 is a diagram illustrating processing and data flow in a case where the authentication information is provided from a first user to a second user.

FIG. 4 is a diagram for describing a method of delivering and receiving the authentication information in the authentication information sharing system according to the embodiment. FIG. 5 is a diagram illustrating processing and data flow in a case where the authentication information is provided from the first user to the second user. Hereinafter, the portable terminal carried by the first user will be referred to as a first user terminal 200a and the portable terminal carried by the second user will be referred to as a second user terminal 200b. The first user terminal 200a and the second user terminal 200b have the same configuration as that of the portable terminal 200 illustrated in FIG. 2. Therefore, not only the first user terminal 200a but also the second user terminal 200b can perform short-range wireless communication with the vehicle control device 11 of the vehicle 10. For this reason, in a case where the second user terminal 200b acquires the authentication information corresponding to the vehicle 10, the second user can use the second user terminal 200b as a key of the vehicle 10. Therefore, in the embodiment, the first user terminal 200a acquires the authentication information for lending from the server device 400 and the authentication information is delivered from the first user terminal 200a to the second user terminal 200b.

Here, the configuration of the server device 400 will be described with reference to FIG. 4. The server device 400 is a computer having a microprocessor, and following functions are implemented by executing a program using the microprocessor. However, some or all of the functions may be implemented by hardware circuits such as ASIC or FPGA. The server device 400 does not need to be implemented by one computer, and may be implemented by cooperation of a plurality of computers.

As illustrated in FIG. 4, the server device 400 includes a request reception unit 401, an information generation unit 402, an information transmission unit 403, and a management unit 404. The request reception unit 401 is means for receiving a distribution request of authentication information transmitted from the first user terminal 200a. The request reception unit 401 receives the distribution request transmitted from the first user terminal 200a via a network.

The information generation unit 402 is means for generating the authentication information according to the distribution request from the first user terminal 200a received by the request reception unit 401. The information generation unit 402 generates the authentication information associated with the vehicle 10 to be used. The information transmission unit 403 is means for transmitting the authentication information generated by the information generation unit 402 to the first user terminal 200a. The information transmission unit 403 transmits the authentication information to the first user terminal 200a via the network. The management unit 404 is means for managing a distribution status of the authentication information in the server device 400. For example, the management unit 404 associates and stores the authentication information to be distributed and a portable terminal that is a distribution destination.

Then, in a case where the first user lends the vehicle 10 to the second user as the content use space, the first user transmits the distribution request of the authentication information for lending from the first user terminal 200a to the server device 400 by manipulating the first user terminal 200a (S201 in FIG. 5). At this time, the first user permits the second user to access the vehicle cabin of the vehicle 10 (that is, locking and unlocking of the door of the vehicle 10) and to manipulate the content providing device 14, but does not permit traveling of the vehicle 10 by the second user (that is, the second user's driving of the vehicle 10). Therefore, the first user requests to add restricted function information (RF (in the drawings describing the embodiment, simply referred to as "RF" in some cases)) I3 to the authentication information for lending in a stage of requesting distribution of the authentication information for lending to the server device 400. Here, the restricted function information (RF) I3 is information by which the execution of the engine start permission control by the vehicle control device 11 of the vehicle 10 is restricted.

In the server device 400, in a case where the request reception unit 401 receives the distribution request and the restricted function request of the authentication information for lending (S201 in FIG. 5), the information generation unit 402 adds deliverable and receivable information (DR (in the drawings describing the embodiment, simply referred to as "DR" in some cases)) I2 together with the restricted function information (RF) I3 to the authentication information I1 associated with the vehicle 10 (S202 in FIG. 5). Here, the deliverable and receivable information (DR) I2 is information that enables the authentication information I1 to be delivered and received between the first user terminal 200a and the second user terminal 200b without going through the server device 400. That is, by the deliverable and receivable information (DR) I2 being added to the authentication information I1, the authentication information I1 can be transmitted from the first user terminal 200a to the second user terminal 200b. In other words, unless the deliverable and receivable information (DR) I2 is added to the authentication information I1 received from the server device 400, the first user terminal 200a cannot transmit the authentication information I1 to the second user terminal 200b. Then, the information transmission unit 403 transmits the authentication information I1 in a state in which the deliverable and receivable information (DR) I2 and the restricted function information (RF) I3 are added, to the first user terminal 200a (S203 in FIG. 5). The server device 400 may be constituted by a plurality of server devices. In this case, a server device that adds the deliverable and receivable information (DR) I2 to the authentication information I1 and a server device that adds the restricted function information (RF) I3 to the authentication information I1 may be different from each other. However, also in this case, the authentication information I1 in a state in which the deliverable and receivable information (DR) I2 and the restricted function information (RF) I3 are added is transmitted to the first user terminal 200a.

In a case where the first user terminal 200a receives the authentication information I1 to which the deliverable and receivable information (DR) I2 and the restricted function information (RF) I3 are added, the first user terminal 200a transmits the authentication information I1 in a state in which the restricted function information (RF) I3 is added, to the second user terminal 200b via an inter-terminal communicator 205a according to the input manipulation of the first user (S204 of FIG. 5). The second user terminal 200b stores the authentication information I1 in a state in which the restricted function information (RF) I3 is added, which is received from the first user terminal 200a via an inter-terminal communicator 205b, in the storage unit of the controller 203. The deliverable and receivable information (DR) I2 is not added to the authentication information I1 transmitted from the first user terminal 200a to the second user terminal 200b. Accordingly, the authentication information I1 cannot be transmitted from the second user terminal 200b to another portable terminal. Therefore, it is possible to prevent the vehicle 10 from being lent again.

Operation of Key System

Figure 6:
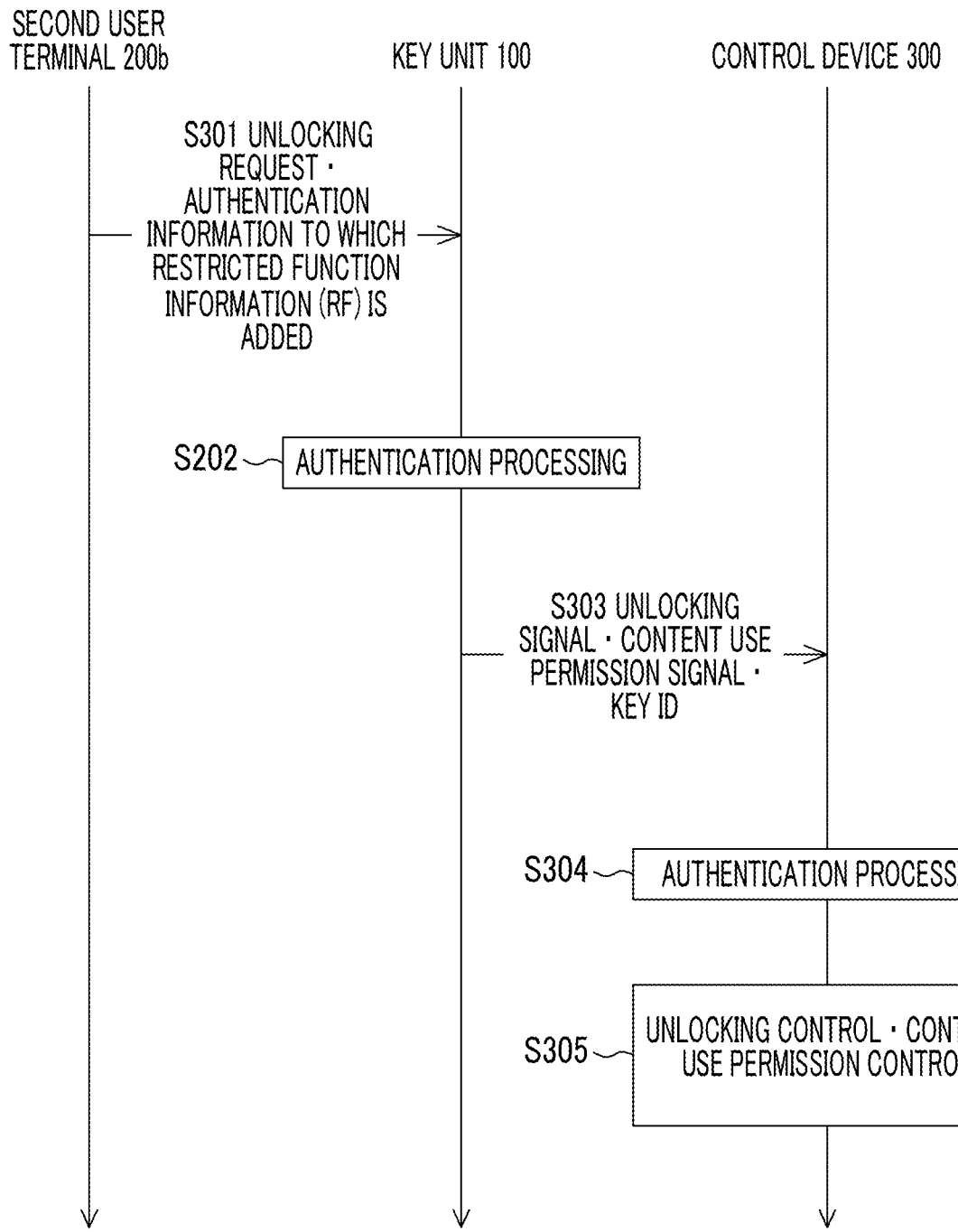
FIG. 6 is a diagram illustrating processing and data flow in a case where the second user unlocks the door of the vehicle.

In the embodiment, the operation of the key system in a case where the second user unlocks the door of the vehicle 10 using the second user terminal 200b having the authentication information I1 in a state in which the restricted function information (RF) I3 is added, will be described. FIG. 6 is a diagram illustrating processing and data flow in a case where the door of the vehicle 10 is unlocked using the second user terminal 200b.

In a case where the second user performs a manipulation of unlocking the door of the vehicle 10 in the second user terminal 200b, the second user terminal 200b transmits the authentication information in a state in which the restricted function information (RF) I3 is added together with the unlocking request, to the key unit 100 of the vehicle control device 11 (S301). Then, the key unit 100 performs the authentication processing based on the authentication information received from the second user terminal 200b (S302). The authentication processing itself in S302 is similar to the authentication processing in S102 of FIG. 3. However, in a case where the restricted function information (RF) I3 is added to the authentication information, even in a case where the authentication information is successfully authenticated in the authentication processing in S302, the engine start permission signal is not transmitted from the key unit 100. That is, only the unlocking signal and the content use permission signal together with the key ID are transmitted to the control device 300 from the key unit 100 (S303). Then, the control device 300 that has received the unlocking signal together with the key ID performs the authentication processing based on the key ID (S304). In a case where the key ID is successfully authenticated, the control device 300 performs the unlocking control for unlocking the door of the vehicle 10 and the content use permission control for making the content ECU 306 enter into the content usable state (S305). At this time, since the control device 300 has not received the engine start permission signal from the key unit 100, the control device 300 does not perform the engine start permission control for making the engine ECU 305 enter into the engine startable state.

As described above, in a case where the restricted function information (RF) I3 is added to the authentication information to be transmitted from the second user terminal 200b to the key unit 100 of the vehicle control device 11, the engine ECU 305 does not enter into the engine startable state. For this reason, the second user carrying the second user terminal 200b can lock and unlock the door of the vehicle 10 and manipulate the content providing device 14, but cannot start the engine 13 of the vehicle 10. Therefore, the second user cannot make the vehicle 10 travel using the second user terminal 200b. That is, in the embodiment, the engine ECU 305 becomes unable to enter into the engine startable state, as a result, the vehicle 10 becomes unable to enter into a state in which the vehicle can travel.

In this way, by the restricted function information (RF) I3 being added to the authentication information delivered from the first user terminal 200a to the second user terminal 200b, it is possible to lend the vehicle 10 to the second user as the content use space, and also to prohibit traveling (driving) of the vehicle 10 by the second user. Therefore, the vehicle 10 on which the content providing device 14 is mounted can be more suitably utilized as the content use space.

With the authentication information sharing system, since the authentication information in a state in which the restricted function information (RF) I3 is added can be transmitted from the first user terminal 200a to the second user terminal 200b without going through the server device 400, it is possible to more smoothly deliver and receive the authentication information in a case where the first user lends the vehicle 10 to the second user as the content use space. With the authentication information sharing system, the authentication information delivered to the second user terminal 200b is also distributed from the server device 400. Therefore, it is possible to suppress generation of the authentication information without limit in the first user terminal 200a and delivery of the generated authentication information to another portable terminal. As a result, it is possible to share the authentication information between the first user terminal 200a and the second user terminal 200b while security is ensured. In addition, since the authentication information for lending is also distributed from the server device 400, the authentication information delivered from the first user terminal 200a to the second user terminal 200b can be recorded or managed on a server device 400 side.

First Modification Example

In the above embodiment, the vehicle control device 11 has the key unit 100. The authentication information is transmitted from the portable terminal 200 to the key unit 100, and then the key ID is transmitted from the key unit 100 to the control device 300. However, it is also possible to adopt a configuration in which the key unit 100 is not interposed between the portable terminal 200 and the control device 300. In this case, the key ID associated with the vehicle 10 is distributed from the server device 400 to the portable terminal 200. Then, the key ID is transmitted from the portable terminal 200 to the control device 300. In this case, the key ID is an example of "the key information". Also in the case of adopting such a configuration, by the deliverable and receivable information (DR) I2 and the restricted function information (RF) I3 being added to the key ID to be distributed from the server device 400 to the first user terminal 200a, the key ID in a state in which the restricted function information (RF) I3 is added can be delivered and received between the first user terminal 200a and the second user terminal 200b. Accordingly, the second user can lock and unlock the door of the vehicle 10 and manipulate the content providing device 14, but cannot start the engine 13 of the vehicle 10.

Second Modification Example

In the above embodiment, the restricted function information (RF) I3 added to the authentication information for lending is set as information restricting the execution of the engine start permission control by the vehicle control device 11 of the vehicle 10. Accordingly, the engine ECU 305 becomes unable to enter into the engine startable state using the second user terminal 200b, as a result, the vehicle 10 becomes unable to enter into the state in which the vehicle can travel. However, the restricted function information (RF) I3 is not limited to such information as long as the information is not able to make the vehicle 10 enter into the state in which the vehicle can travel by the authentication information for lending. Therefore, for example, the restricted function information (RF) I3 may be set as information that enables the execution of the engine start permission control by the vehicle control device 11 but causes the output control of the engine 13 based on the accelerator operation amount of the vehicle 10 to be not possible (that is, information to block an input of an output signal of an accelerator operation amount sensor to the engine ECU 305). Even in a case where the restricted function information (RF) I3 is set as such information, it is possible to prohibit traveling (driving) of the vehicle 10 by the second user.

Third Modification Example

FIG. 7 is a diagram for describing a method of delivering and receiving authentication information in the authentication information sharing system according to the modification example. In the authentication information sharing system according to the above embodiment, as illustrated in FIG. 4, the authentication information for lending that is used for lending a vehicle to the second user is distributed from the server device 400 to the first user terminal 200a, and the authentication information for lending is transmitted from the first user terminal 200a to the second user terminal 200b. However, as illustrated in FIG. 7, it is also possible to adopt a system in which the authentication information for lending is directly transmitted from the server device 400 to the second user terminal 200b.

Even in a case of the modification example, a distribution request and a restricted function request of authentication information for lending are transmitted from the first user terminal 200a to the server device 400. At this time, information on the second user terminal 200b to be a transmission destination of the authentication information for lending is also transmitted to the server device 400. Then, the server device 400 specifies the second user terminal 200b based on the received information and transmits the authentication information I1 in a state in which the restricted function information (RF) I3 is added, to the second user terminal 200b. Even with such a system, it is possible to provide the authentication information to which the restricted function information (RF) I3 is added, to the second user. However, as described above, in the authentication information sharing system (system illustrated in FIG. 4) according to the embodiment, since it is possible to transmit the authentication information in a state in which the restricted function information (RF) I3 is added, from the first user terminal 200a to the second user terminal 200b without going through the server device 400, the authentication information can be more smoothly delivered and received between the first user terminal 200a and the second user terminal 200b.

In a case where an owner of a vehicle lends the host vehicle to another person as the content use space by using the authentication information sharing system as described above, information on the host vehicle may be made public on the web via the Internet by a predetermined application. The "information on the host vehicle" in this case is information on the position of the vehicle, the lendable time for the vehicle, contents of the digital contents (list of the digital contents and the like) that can be provided by the content providing device mounted on the vehicle, or the like. By such information being made public, it becomes possible for the other persons who desire to use the vehicle as the content use space to search for vehicles to be used.

According to a charging fee in a case where another person borrows the vehicle as the content use space, the digital contents that can be provided by the content providing device may be restricted. In this case, content use restriction information imposing restrictions on the content provided by the content providing device may be added to the authentication information to be transmitted to a portable terminal carried by the other person according to a restriction content. In a case where the content use restriction information is added to the authentication information received by the portable terminal, in a case where the content providing device is used using the portable terminal, it becomes not possible to use some content according to the content use restriction information. According to the above descriptions, it is possible to place the restrictions according to the charging fee on the content that can be provided by the other person who has borrowed the vehicle manipulating the content providing device.

What is claimed is:

1. A distribution device comprising:
    a server device configured to distribute key information to a first user terminal that is a portable terminal carried by a first user of a vehicle, wherein:
        the key information is used for a key system that determines whether or not to lock and unlock the vehicle, to make the vehicle travel, and to use a content providing device that provides digital contents in a vehicle cabin of the vehicle by transmitting the key information from the first user terminal to the vehicle,
        the key information includes restricted function information that is information indicating that locking and unlocking of the vehicle and use of the content providing device are permitted but traveling of the vehicle is not permitted,
        the key information includes deliverable and receivable information making the key information deliverable and receivable between the first user terminal and a second user terminal that is a portable terminal carried by a second user of the vehicle without going through the server device, and
        the deliverable and receivable information is excluded from the key information when the key information is sent from the first user terminal to the second user terminal.

2. A method of controlling a distribution device including a server device configured to distribute key information to a first user terminal that is portable terminal carried by a first user of a vehicle, the key information being used for a key system that determines whether or not to lock and unlock the vehicle, to make the vehicle travel, and to use a content providing device that provides digital contents in a vehicle cabin of the vehicle by transmitting the key information from the first user terminal to the vehicle, the method comprising:
    generating, by the server device, the key information that includes restricted function information that is information indicating that locking and unlocking of the vehicle and use of the content providing device are permitted but traveling of the vehicle is not permitted; and
    distributing, by the server, the key information that includes the restricted function information, to the first user terminal, wherein
        the key information includes deliverable and receivable information making the key information deliverable and receivable between the first user terminal and a second user terminal that is a portable terminal carried by a second user of the vehicle without going through the server device, and
        the deliverable and receivable information is excluded from the key information when the key information is sent from the first user terminal to the second user terminal.

3. A non-transitory computer-readable recording medium storing a program causing a computer to execute a method of controlling a distribution device including a server device configured to distribute key information to a first user terminal that is a portable terminal carried by a first user of a vehicle, the key information being used for a key system that determines whether or not to lock and unlock the vehicle, to make the vehicle travel, and to use a content providing device that provides digital contents in a vehicle cabin of the vehicle by transmitting the key information from the first user terminal to the vehicle, the program causing a control process of the distribution device to be executed, the control process comprising:
    generating, by the server device, the key information that includes restricted function information that is information indicating that locking and unlocking of the vehicle and use of the content providing device are permitted but traveling of the vehicle is not permitted; and
    distributing, by the server, the key information that includes the restricted function information, to the first user terminal, wherein
        the key information includes deliverable and receivable information making the key information deliverable and receivable between the first user terminal and a second user terminal that is a portable terminal carried by a second user of the vehicle without going through the server device, and
        the deliverable and receivable information is excluded from the key information when the key information is sent from the first user terminal to the second user terminal.

* * * * *